(No Model.)
G. S. LONG.
WHEEL.
No. 320,076. Patented June 16, 1885.
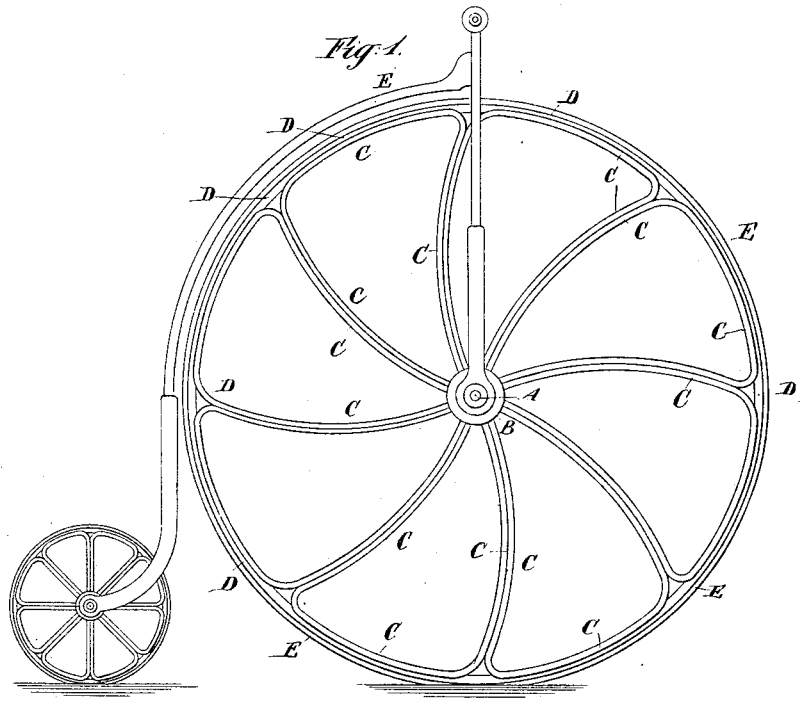
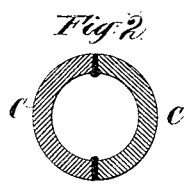 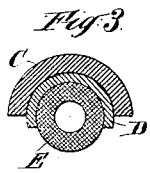 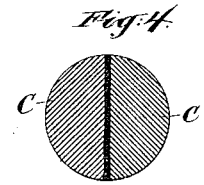 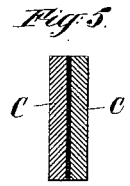
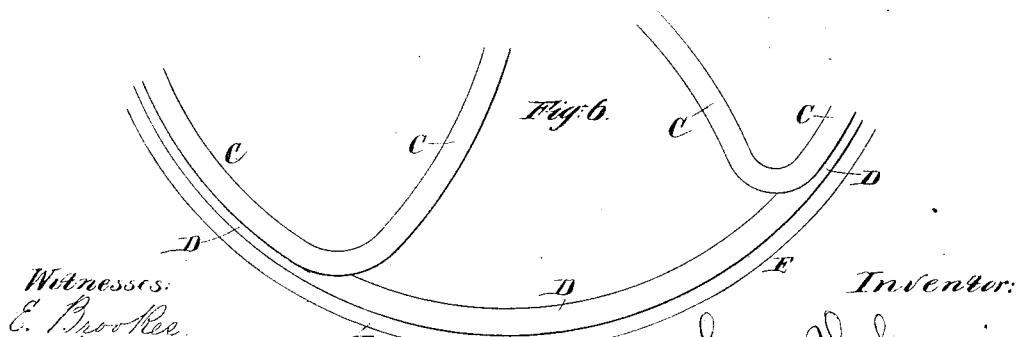
Witnesses:
E. Brookes
M. J. Boyle
Inventor:
George S. Long
by his attorney
Thomas Drew Stetson

UNITED STATES PATENT OFFICE.

GEORGE S. LONG, OF HARTFORD, CONNECTICUT, ASSIGNOR TO HIMSELF AND GEORGE W. WILLIAMS, OF SAME PLACE.

WHEEL.

SPECIFICATION forming part of Letters Patent No. 320,076, dated June 16, 1885.

Application filed March 6, 1885. (No model.)

*To all whom it may concern:*

Be it known that I, GEORGE S. LONG, of Hartford, in the county of Hartford and State of Connecticut, have invented certain new and useful Improvements in Wheels, of which the following is a specification.

I have devised a strong and elastic wheel, which can be made in the large way with great economy. It is adapted for use in bicycles, tricycles, children's carriages, and light carriages generally. I construct the parts in section and unite them strongly by brazing.

The following is a description of what I consider the best means of carrying out the invention as applied to a bicycle.

The accompanying drawings form a part of this specification.

Figure 1 is a side elevation. The remaining figures are on a larger scale. Fig. 2 is a cross-section through one of the spokes. Fig. 3 is a cross-section through the rim. Figs. 4 and 5 are modifications; they are cross-sections corresponding to Fig. 2. Fig. 6 shows a modification.

Similar letters of reference indicate corresponding parts in all the figures where they occur.

A is a shaft, which may have the usual cranks for impelling it by the feet. B is the hub of the wheel. C C, &c., are nicely-bent pieces of steel, which perform important functions. Each is in section half of a hollow cylinder. Both ends are received in the hub B and secured therein.

To constitute a spoke or arm of the wheel, two pieces C are applied together, edge to edge, and brazed. Each piece C extends outward to the periphery of the wheel, then extends along the periphery, and then extends inward. Thus each forms a portion of the rim and a portion of two arms. I have shown the arms as curved. This is of advantage in giving elasticity. A continuous rim or hoop, D, extends quite around the periphery of the wheel. This may be of steel, having a cross-section similar to C. Each piece C applies to the exterior piece or continuous ring, D, so that the outer face of the arc formed by the piece C and the inner face of the corresponding part of D are in contact. They are brazed together, making a strong and stiff rim, with a groove suitable to receive a rubber tire. The wheel is of great strength and very light. Unlike the wheels in common use with wire arms, every part is capable of serving to resist either a thrusting or tensile force.

E is a rubber tire sprung into the hollow exterior of the rim D. The tire is a hollow tube, and may in all respects be similar to small thick rubber tubes employed for conveying water, except that its ends are cemented or otherwise smoothly joined together to form a continuous elastic ring.

Modifications may be made in the forms and proportions without departing from the principle or sacrificing the advantages of the invention.

Parts of the invention can be used without the whole.

I can dispense with the brazing of C to D to form the rim, and employ rivets instead; or I can leave these parts not directly fastened together. I prefer the whole as set forth.

For very light wheels only half the number of the pieces C may suffice. In such case alternate pieces C will be omitted, and each spoke or arm of the wheel will have only one part C. Fig. 6 shows a portion of a wheel so constructed.

For extra-stout wheels the hoop D may be formed from a half-round bar, so as to present a periphery not grooved. It may even be made from round steel.

I attach much importance to the brazing of the parts together.

I can make a good wheel by forming the parts corresponding to C and D of steel of rectangular section, in ordinary flat bars, bent as shown, and brazed together.

I claim as my invention—

1. A wheel composed of spoke-sections and a rim brazed together, each spoke-section forming a part of two spokes, and being secured by brazing to the rim-section and to each adjacent spoke-section, as set forth.

2. The wheel described, having arms and portions of the periphery composed of half-tubes C, in combination with a ring, D, of a similar half-tube, and a soft tire, combined and arranged for joint operation, substantially as herein specified.

In testimony whereof I have hereunto set my hand, at Hartford, Connecticut, this 26th day of February, 1885, in the presence of two subscribing witnesses.

G. S. LONG.

Witnesses:
LEWIS T. SMITH,
SAML. NOTT.